(12) United States Patent
Garskof (10) Patent No.: US 8,437,742 B2
(45) Date of Patent: May 7, 2013

(54) SYSTEMS AND METHODS FOR PROVIDING LOCATION-BASED APPLICATION AUTHENTICATION USING A LOCATION TOKEN SERVICE

(75) Inventor: Robert Garskof, Northford, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 812 days.

(21) Appl. No.: 12/580,543

(22) Filed: Oct. 16, 2009

(65) Prior Publication Data

US 2011/0092185 A1   Apr. 21, 2011

(51) Int. Cl.
*H04M 1/66* (2006.01)

(52) U.S. Cl.
USPC ............... 455/411; 455/456.1; 455/456.2; 380/247; 380/258

(58) Field of Classification Search ........... 455/410, 455/411, 456.1, 456.2; 380/247, 258, 259, 380/270, 279, 44; 726/3, 4, 5, 6, 8, 9
See application file for complete search history.

(56) References Cited

U.S. PATENT DOCUMENTS

| 8,190,221 B2 * | 5/2012 | Jain et al. .................. 455/575.8 |
| 2003/0065947 A1 * | 4/2003 | Song et al. ..................... 713/201 |
| 2006/0046744 A1 * | 3/2006 | Dublish et al. ............. 455/456.3 |

* cited by examiner

*Primary Examiner* — Temica M Beamer
(74) *Attorney, Agent, or Firm* — Parks IP Law LLC; Mickki D. Murray, Esq.

(57) ABSTRACT

Systems and methods for implementing a location token service (LTS) to enhance the security of mobile device identity tokens by using the location of the mobile device to augment the tokens. The LTS enforces re-authentication (login) of the mobile device to one or more applications if the mobile device moves beyond a threshold distance from the location of the last use of the token within a time period defined in a temporal threshold. The LTS increases authentication strength and drastically reduces the potential for spoofing or otherwise permitting unauthorized access to one or more applications on the mobile device.

19 Claims, 5 Drawing Sheets

SYSTEMS AND METHODS FOR PROVIDING LOCATION-BASED APPLICATION AUTHENTICATION USING A LOCATION TOKEN SERVICE

TECHNICAL FIELD

The present disclosure relates generally to application authentication and, more particularly, to systems and methods for providing location-based application authentication using a location token service.

BACKGROUND

In the enterprise environment, companies often provide mobile devices to employees and develop a suite of applications to facilitate the day-to-day computing needs of the employees. For security reasons, many of these applications require some form of authentication. Rather than require a user to logon to each individual application, single sign on (SSO) allows the user to enter a user identification and password to logon to a shared network to access multiple applications.

User identifications and passwords are not the most secure authentication mechanism and can be spoofed by unauthorized parties. As a result, SSO is sometimes enhanced by using digital certificates, security tokens, smart cards, and/or biometric authentication mechanisms, for example, to provide access to higher risk applications and information.

SSO between applications on a mobile device sometimes require a shared token. Certain mobile devices, such as the Apple® iPhone® (available from Apple Corporation of Cupertino, California), for example, prevent sharing of tokens between applications, thereby restricting the ability of companies to use SSO between multiple applications on the device. Applications can use a device's built-in identity, including the telephone number (TN) and the Universal Unique Identifier (UUID), for authentication. These identifiers, however, are fixed and easily found, allowing for spoofing of the device's identity.

SUMMARY

Systems and methods of the present disclosure provide for implementation of a location token service (LTS) to enhance the security of mobile device identity tokens by using the location of the mobile device to augment the tokens. The LTS enforces re-authentication (login) of the mobile device to one or more applications if the mobile device moves a particular distance (e.g., a pre-determined threshold distance) from the location of the last use of the token. The LTS increases authentication strength and drastically reduces the potential for spoofing or otherwise permitting unauthorized access to one or more applications on the mobile device.

In some embodiments, the LTS is configured to limit authentication of applications based upon factors such as the location or movement of the mobile device, or location or movement and time. In such ways, operation of the mobile device can be controlled. To analyze movement, for instance, the LTS can compare the proximity of the mobile device to the location of the last use of the token. For example, the LTS could remove functionality from the mobile device if the mobile device travels more than fifty miles in an hour. The tighter the control, the more secure and the more logins are required. The looser the control, the less secure and the fewer logins are required. The controlling factors, such as distance and/or time from the last use of the token, are set, for example, by a network administrator, IT personnel, another party, or a system.

In some embodiments, the LTS exists as an LTS client application on the mobile device and an LTS server application on a network, such as a company's intranet (enterprise intranet). The LTS client application and the LTS server application work together to identify a user and maintain a logged in state between applications on the mobile device as the mobile device travels.

Each mobile device includes a telephone number (TN) and a Universal Unique Identifier (UUID) assigned to it. The TN is assigned by the wireless service provider and the UUID is assigned by the mobile device manufacturer. Both are usually embedded in the subscriber identity module (SIM) of the mobile device and are accessible via software application programming interfaces (APIs).

The mobile device includes a location services application that provides location information, for example, in the form of latitude and longitude coordinates. In some embodiments, the location information is retrieved via location determining techniques including, but not limited to, cellular triangulation, global positioning system (GPS), assisted GPS (A-GPS), and WIFI triangulation.

At login time, the mobile device provides to the LTS server, by way of the LTS client application, the UUID, TN, and initial location information of the mobile device, in addition to the user ID and password. The LTS server records this authentication data as a session for the mobile device. The mobile device then uses the UUID, TN, and present location information as a secure token to provide the identity of the user. The LTS server validates these values based upon whether it is determined, based upon a pre-determined threshold distance, that the mobile device could have traveled from the initial location to the present location in a given time. In some embodiments, the pre-determined threshold distance is defined by a network administrator, IT personnel, another party, or a system, for example. If the distance traveled is determined to be greater than the threshold distance, the mobile device will challenge the user for his/her user ID and password again. Otherwise, the mobile device will accept the authentication data and allow access to one or more applications.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

Figure 1:
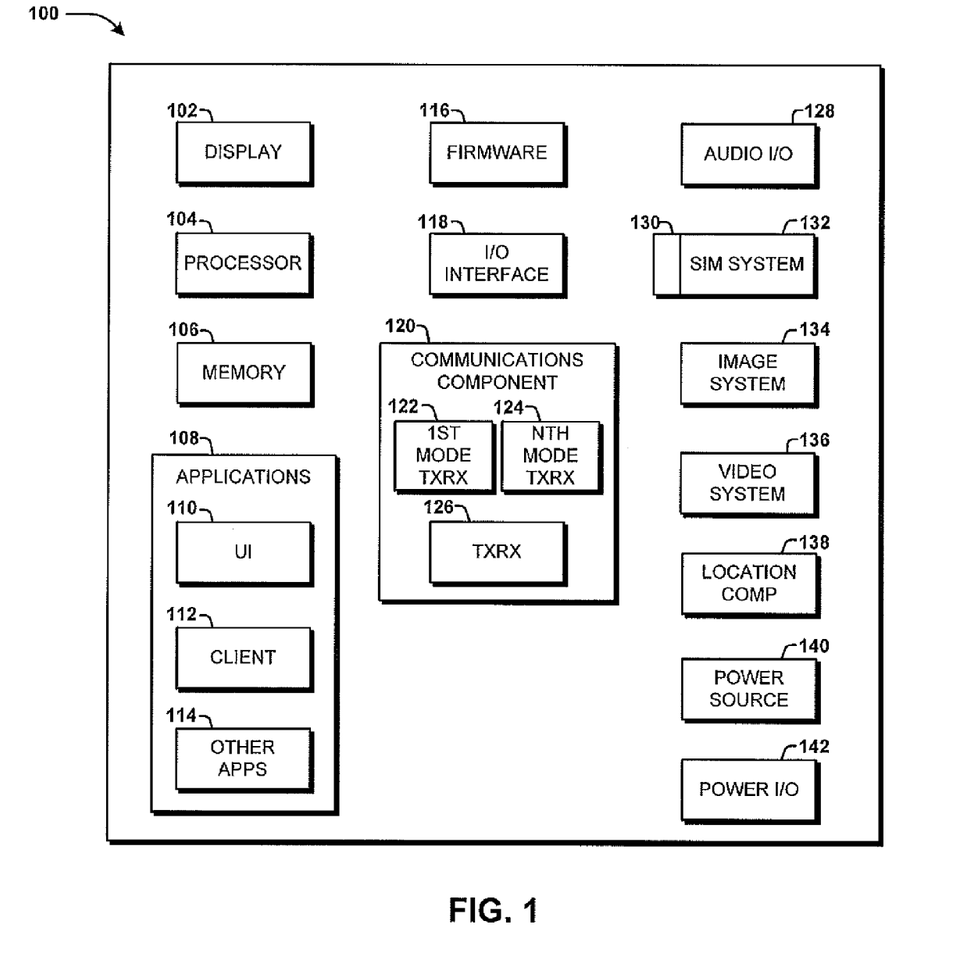
FIG. 1 illustrates an exemplary mobile device and components thereof, according to an embodiment of the present disclosure.

FIG. 1 illustrates a schematic block diagram of an exemplary mobile device 100 for use in accordance with embodiments of the present disclosure. Although connections are not shown between the components illustrated in FIG. 1, the components can interact with each other to carry out device functions. In some embodiments, for example, the components are arranged so as to communicate via one or more busses (not shown). It should be understood that FIG. 1 and the following description are intended to provide a general understanding of a suitable environment in which the various aspects of some embodiments of the present disclosure can be implemented.

In some embodiments, the mobile device 100 is a multimode headset and has a variety of computer readable media, including, for example, volatile media, non-volatile media, removable media, and non-removable media. The term "computer-readable media" and variants thereof, as used in the specification and claims, refers to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, -magnetic disk storage or other magnetic storage devices, or any other medium that can be used to store the desired information and that can be accessed by the mobile device 100.

As illustrated in FIG. 1, the mobile device 100 includes a display 102 for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, and the like. The illustrated mobile device 100 also includes a processor 104 for controlling, processing data, and/or executing computer-executable instructions of one or more applications, and a memory 106 for storing data and/or one or more applications 108.

In some embodiments, the application(s) 108 include a user interface (UI) application 110. The UI application 110 interfaces with a client 112 (e.g., an operating system (OS)) to facilitate user interaction with device functionality and data. In some embodiments, the client 112 is one of Symbian OS, Microsoft® Windows® Mobile OS (available from Microsoft® Corporation of Redmond, Wash.), Palm® webOS™ (available from Palm® Corporation of Sunnyvale, Calif.), Palm® OS (available from Palm® Corporation of Sunnyvale, Calif.), RIM® BlackBerry® OS (available from Research In Motion Limited of Waterloo, Ontario, Canada), Apple® iPhone® OS (available from Apple® Corporation of Cupertino, Calif.), or Google™ Android™ OS (available from Google™ of Mountain View, Calif.). These operating systems are merely exemplary of the operating systems that can be used in accordance with the embodiments disclosed herein. Other operating systems are contemplated.

The UI application 110 aids the user in entering message content, viewing received messages, answering/initiating calls, entering/deleting data, entering and setting user IDs and passwords, configuring settings, manipulating address book content and/or settings, interacting with other applications 114, and the like. In some embodiments, the other applications 114 include, for example, add-ons, plug-ins, email applications, music applications, video applications, camera applications, location service applications (LSAs), power conservation applications, game applications, productivity applications, entertainment applications, enterprise applications, customer information management applications, accounting applications, authentication applications, location token service (LTS) client applications, proprietary business applications, manufacturing applications, production applications, payroll applications, combinations thereof, and the like. The applications 108 are stored in the memory 106 and/or in a firmware 116, and can be executed by the processor 104. The firmware 116 can also store code for execution during device 100 power up, for example.

The illustrated mobile device 100 also includes an input/output (I/O) interface 118 for input/output of data, such as, for example, user IDs, passwords, and application initiation (start-up) requests. In some embodiments, the I/O interface 118 is a hardwire connection, such as, for example, a USB, mini-USB, audio jack, PS2, IEEE 1394, serial, parallel, Ethernet (RJ48) port, RJ11 port, or the like. In some embodiments, the I/O interface 118 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 118 can be used for communications between the mobile device 100 and a network or local device, instead of, or in addition to, a communications component 120.

The communications component 120 interfaces with the processor 104 to facilitate wired/wireless communications with external systems. Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 120 includes a multimode communications subsystem for providing cellular communications via different cellular technologies. In some embodiments, for example, a first cellular transceiver 122 operates in one mode, such as, Global System for Mobile communications (GSM), and an Nth transceiver 124 operates in a different mode, such as Universal Mobile Telecommunications System (UMTS). While only two transceivers 122, 124 are illustrated, it should be appreciated that a plurality of transceivers can be included.

The illustrated communications component 120 also includes a transceiver 126 for use by other communications technologies such as, for example, WIFI, WIMAX, BLUETOOTH, infrared, infrared data association (IRDA), near field communications (NFC), RF, and the like. In some embodiments, the communications component 120 also facilitate reception from terrestrial radio networks, digital satellite radio networks, Internet-based radio services networks, combinations thereof, and the like. The communications component 120 can process data from a network such as, for example, the Internet, an intranet (e.g., business intranet), a home broadband network, a WIFI hotspot, and the like, via an ISP, DSL provider, or broadband provider. In some embodiments, the communications component 120 facilitates the transmission of authentication information from the mobile device 100 to a network for processing in accordance with the methods described herein.

Audio capabilities for the mobile device 100 can be provided by an audio I/O component 128 that includes a speaker for the output of audio signals and a microphone to collect audio signals.

The illustrated mobile device 100 also includes a slot interface 130 for accommodating a subscriber identity system 132 such as, for example, a subscriber identity module (SIM) card or universal SIM (USIM) card. Alternatively, the subscriber identity system 132 can be manufactured into the device 100, thereby obviating the need for a slot interface 130. In some embodiments, the subscriber identity system 132 stores the Universal Unique Identifier (UUID) of the mobile device 100 and the telephone number (TN) of the mobile device 100 for use in accordance with the methods described herein. In some embodiments, the subscriber identity system 132 is programmed by a manufacturer, a retailer, a user, a computer, a network operator, or the like.

The illustrated mobile device 100 also includes an image capture and processing system 134 (image system). Photos and/or videos can be obtained via an associated image capture subsystem of the image system 134, for example, a camera. The illustrated mobile device 100 also includes a video system 136 for capturing, processing, recording, modifying, and/or transmitting video content.

The illustrated mobile device also includes a location component 138 for sending and/or receiving signals such as, for example, GPS data, assisted GPS (A-GPS) data, WIFI/WIMAX and/or cellular network triangulation data, combinations thereof, and the like, for determining a location of the mobile device 100. In some embodiments, the location component 138 interfaces with cellular network nodes, telephone lines, satellites, location transmitters and/or beacons, wireless network transmitters and receivers, for example, WIFI hotspots, radio transmitters, combinations thereof, and the like. In some embodiments, the location component 138 retreives location information at the request from a location services application (LSA).

Using the location component 138, the mobile device 100 obtains, generates, and/or receives data to identify its location, or transmits data used by other devices to determine the mobile device 100 location. In some embodiments, the location of the mobile device 100 is used by an LTS client application as part of an authentication message sent from the mobile device 100 to a network server to authenticate one or more applications (e.g., the applications 108, 114). Methods for authenticating one or more applications based, in part, upon a location of the mobile device 100 as determined by the location component 138 are described with reference to FIGS. 4 and 5.

The illustrated mobile device 100 also includes a power source 140, such as batteries and/or other power subsystem (AC or DC). The power source 140 can interface with an external power system or charging equipment via a power I/O component 142.

Figure 2:
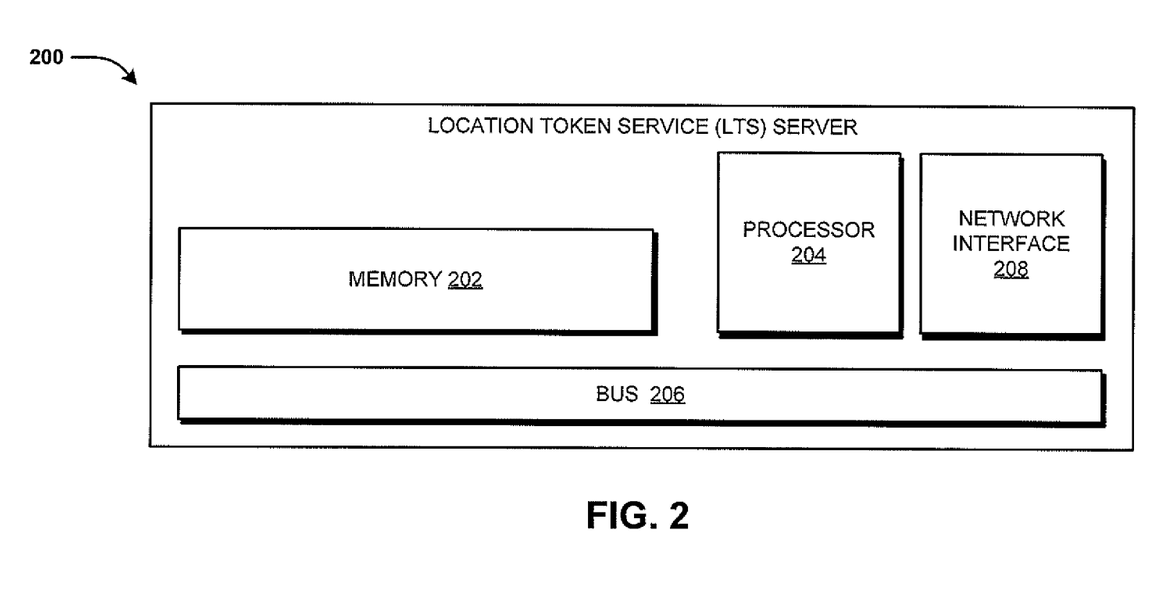
FIG. 2 illustrates an exemplary location token service (LTS) server, according to an embodiment of the present disclosure.

Referring now to FIG. 2, a location token service (LTS) server 200 and components thereof are illustrated, according to an embodiment of the present disclosure. Although connections are not shown between the components illustrated in FIG. 2, the components can interact with each other to carry out system functions. It should be understood that FIG. 2 and the following description are intended to provide a brief, general description of a suitable environment in which the various aspects of some embodiments of the present disclosure can be implemented.

In the illustrated embodiment, the LTS server 200 is a combination of hardware and software. The illustrated LTS server 200 includes one or more memory modules 202 that are operatively linked and in communication with one or more processors 204 via one or more data/memory busses 206. The illustrated LTS server 200 also includes a network interface 208 for facilitating communication with the mobile device 200. For example, the LTS server 200 communicates with the mobile device and vice versa to authenticate the mobile device 200 to use one or more applications.

The term memory, as used herein to describe the memory 202, collectively includes all memory types associated with the LTS server 200. Examples of memory types include, but are not limited to, processor registers, processor cache, random access memory (RAM), other volatile memory forms, and non-volatile, semi-permanent or permanent memory types. Examples of non-volatile memory types include, but are not limited to, tape-based media, optical disc media, solid state media, hard disks, storage arrays, database structures, combinations thereof, and the like. While the memory 202 is illustrated as residing proximate the processor 204, it should be understood that the memory 202 can be a remotely accessed storage system, such as, a local server, an Internet server, a remote hard disk drive, a removable storage medium, a network storage device, combinations thereof, and the like. Any of the data, applications, and/or software described below in connection with the LTS server 200 can be stored within the memory 202, as illustrated, and/or accessed via network connections to other data processing systems (not shown). The networked data processing systems may include LAN, MAN, or WAN networked systems, for example. Accordingly, in some embodiments of the present disclosure, the LTS server 200 is configured as a server to one or more client data processing systems, such as the mobile device 100, as dictated by a client/server model, for example.

Figure 3:
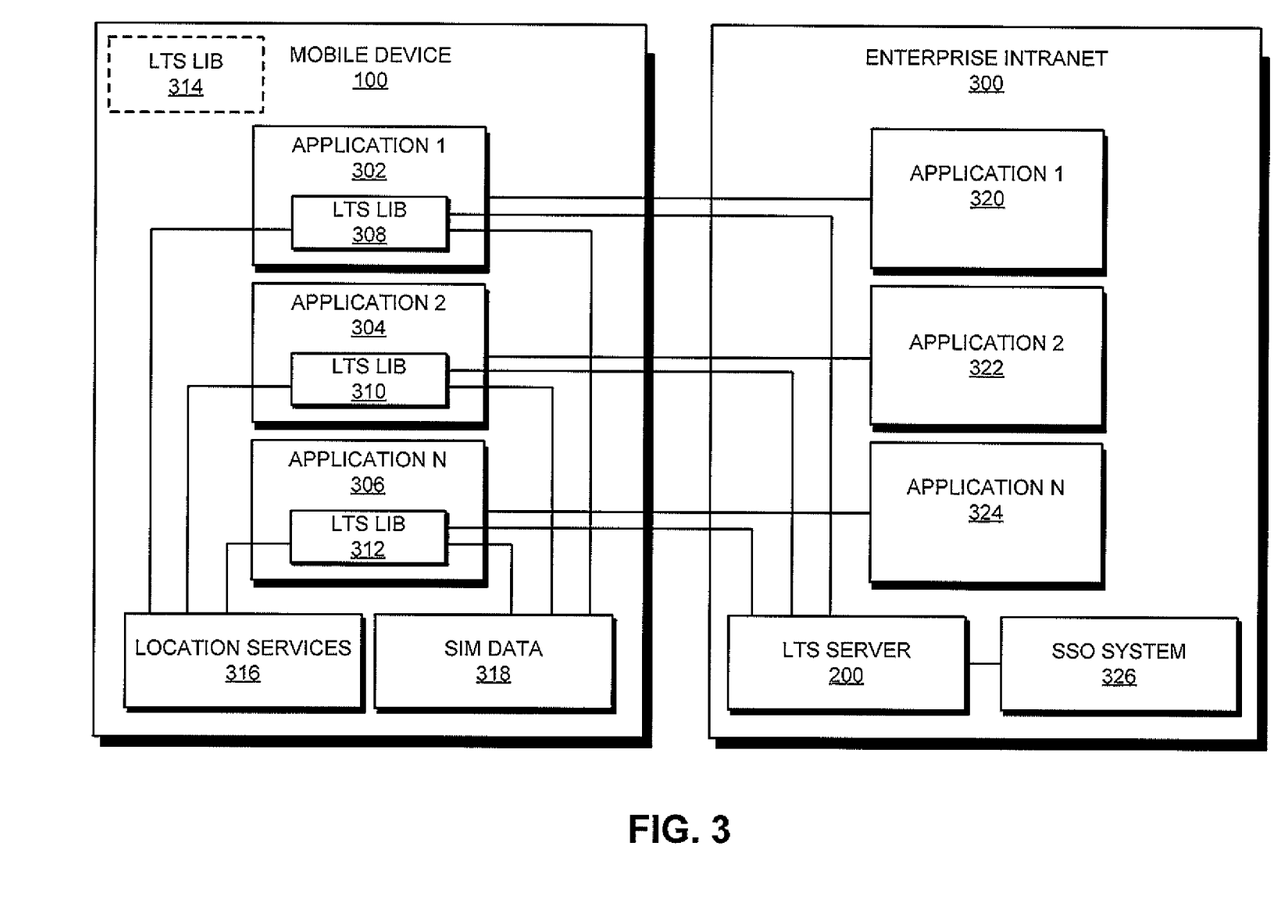
FIG. 3 illustrates an exemplary system architecture, according to an embodiment of the present disclosure.

Referring now to FIG. 3, a system architecture is illustrated in accordance with an embodiment of the present disclosure. The illustrated system architecture includes the mobile device 100 and an enterprise intranet 300. In the present view, the mobile device 100 includes multiple applications 302, 304, 306, each of which is illustrated as including an LTS service library (LTS LIB) 308, 310, 312, respectively. In some embodiments, the applications 302, 304, 306 and the LTS LIBs 308, 310, 312, 314 are included as part of the applications 108, 114 of the mobile device 100 as illustrated in FIG. 1. In other embodiments, the applications 302, 304, 306 are programmed to call upon the LTS LIB 314 for the functions described below. In some embodiments, the LTS LIBs 308, 310, 312 are included in the program code of each application 302, 304, 306 and may include various instructions based upon the needs of a particular application. That is, in some embodiments, the LTS LIBs 308, 310, 312 are customized for a particular application and are programmed as part of that application. In other embodiments, the LTS LIBs 308, 310, 312 are provided external to the applications 302, 304, 306 as distinct libraries or as a comprehensive LTS LIB 314. In some embodiments, the applications 302, 304, 306 are programmed to call upon the respective LTS LIB 308, 310, 312 for the functions described below. The LTS LIBs 308, 310, 312, 314 may form an LTS client application on the mobile device 100, for example.

As used herein, the term library refers to a collection of subroutines, programs, and/or classes used to provide services, such as an LTS, to authenticate the mobile device 100 to use programs including, for example, the illustrated applications 302, 304, 306. The libraries described herein can be programmed and configured to perform the functions described below in further detail with reference to FIGS. 4 and 5. Those skilled in the art will appreciate and understand that the LTS LIBs 308, 310, 312, 314 can be implemented in accordance with the present disclosure as static or dynamic libraries. That is, the subroutines and/or programs of the LTS LIBs 308, 310, 312, 314 can be linked to an application at compile time or loaded into an application at run time. It is contemplated that other methods of linking libraries and applications that are known in the art can be used.

The LTS LIBs 308, 310, 312 and the comprehensive LTS LIB 314 are now described in greater detail. For purposes of readability, the LTS LIBs 308, 310, 312, 314 are now collectively referred to as the LTS LIB 314. It should be understood, however, that the description provided below is equally applicable to each of the illustrated LTS LIBs 308, 310, 312, 314 unless otherwise noted.

The LTS LIB 314 includes a set of instructions in the form of a library for managing interaction between the mobile device 100 and the LTS server 200 541 on behalf of the associated application(s) (e.g., applications 308, 310, 312). In particular, the LTS LIB 314 is configured for retrieving location information from a location services application (LSA) 316, and SIM data 318, such as the mobile device's UUID and TN, from the SIM system 132. The LTS LIB 314 is also configured for transmitting the location information, UUID, and TN to the LTS server 200, and, if needed, displaying a login page on the display 102 of the mobile device 100. In some embodiments, the LTS LIB 314 receives the location information automatically and periodically from the LSA 316 without the need to request the location information.

The LTS LIB 314 is configured to retrieve location information from the communications component 120 and/or the location component 138 by way of, for example, the LSA 316. In some embodiments, the LSA 316 is included as part of the mobile device's OS (e.g., the client 112) and may be called upon by any application, such as the illustrated applications 302, 304, 306, and/or the LTS LIB 314 to retrieve location information.

Generally, the LSA 316 employs at least one of WIFI, WIMAX, cellular, and GPS technologies to determine the location of the mobile device 100 based upon a user-initiated request or an application-initiated request. The type of technology used can be dictated by the capabilities of the mobile device 100. For example, in some embodiments, the mobile device 100 includes only a cellular transceiver and can only retrieve location information using cellular triangulation techniques. In other embodiments, the mobile device 100 further includes a WIFI radio and can supplement the cellular triangulation data with WIFI triangulation data to determine a more accurate location of the mobile device 100. In still other embodiments, the mobile device 100 includes a GPS system for obtaining location information.

The LTS LIB 314 is further configured to obtain SIM data 318, such as the mobile device's UUID and TN, from the SIM system 132. Alternatively, the LTS LIB 314 can retrieve the UUID and/or TN from the memory 106 depending upon the storage configuration of the mobile device 100. The LTS LIB 314 sends the location information, the UUID, and the TN to the LTS server 200. The LTS server 200 uses this information to authenticate the mobile device 100 for a particular application, as described in further detail below with reference to Ms. 4 and 5. As also be described in further detail below, in some embodiments, the LTS LIB 314 is configured to communicate with an application (e.g., the applications 320, 322, 324) to provide a login page to the display 102 for presenting a login request to a user of the mobile device 100 if the mobile device 100 has traveled a distance greater than a threshold distance.

In the illustrated embodiment, the LTS server 200 accepts requests for authentication of an application from the LTS LIB 314 and validates the credentials (La, UUID, TN, location information, tokens) using a single sign-on (SSO) system 326. In some embodiments, the application is a remote application, such as an enterprise application 320, 322, 324. In this embodiment, the mobile device 100 is allowed access to the enterprise application 320, 322, 324 via the enterprise network 300 after authentication. In some embodiments, the enterprise applications 320, 322, 324 include the enterprise component of software operating on the mobile device 100, such as the mobile device applications 302, 304, 324. In some embodiments, the enterprise applications 320, 322, 324 are stored on enterprise servers (not shown) in the enterprise network 300 or on the LTS server 200. It should be noted that the enterprise applications 320, 322, 324 do not need to be aware of the LTS LIB 314. Instead, the enterprise applications 320, 322, 324 can be provided the identity returned by the LTS server 200 without the need for the enterprise applications 320, 322, 324 to be involved in the login process.

In some embodiments, the LTS server 200 is a combination of hardware and software (e.g., an LTS server-side client application) configured to selectively provide the mobile device 100 access to one or more network applications. In some embodiments, the LTS server 200 stores one or more LTS keys and distributes the LTS keys to mobile devices that are pre-authorized to access the enterprise intranet 300. When the mobile device 100 seeks to access an application that requires LTS authentication, the mobile device 100 provides the LTS key to the LTS server 200 with its location information, UUID, and TN.

In some embodiments, LTS keys are defined by a network administrator or other personnel. In other embodiments, LTS keys are generated using a key sequence generator, such as a pseudorandom key sequence generator (not shown) of the LTS server 200. In still other embodiments, the LTS server 200 assigns LTS keys to each mobile device that requests access to the enterprise intranet 300 and is pre-authorized to access the enterprise intranet 300. For example, when a mobile device is registered with the enterprise intranet 300, the LTS server 200 provides the mobile device 100 with an LTS key to use in a request to access an application requiring LTS authentication.

In some embodiments, the LTS keys are static and have no expiration time. In other embodiments, the LTS keys are static and valid only for a specified time. In still other embodiments, the LTS keys are dynamic and periodically generated by the LTS server 200. As an example, the LTS server 200 can be configured to push a dynamic LTS key to the mobile device 100 after the mobile device 100 is logged in (e.g., after authentication with a previous key).

Figure 4:
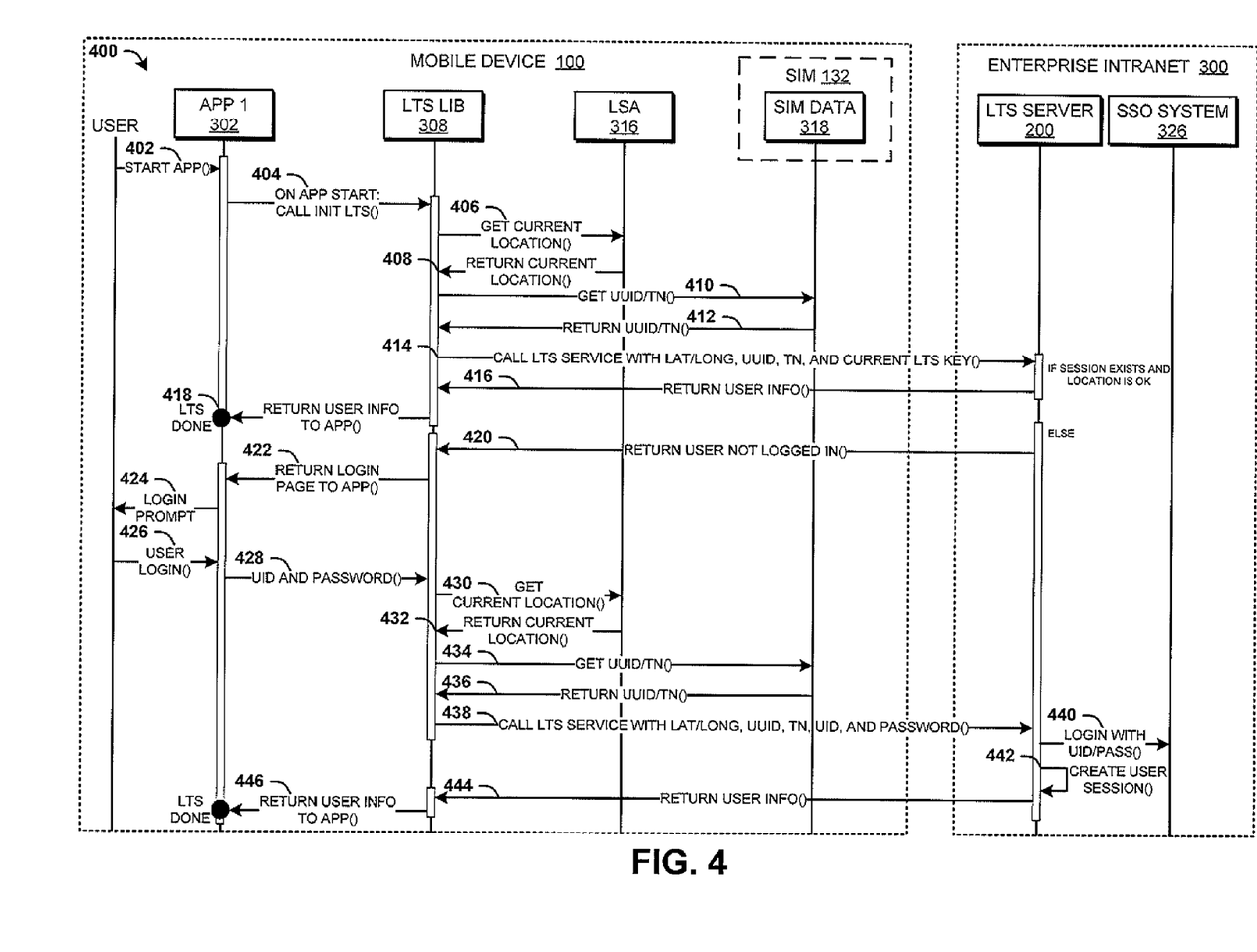
FIG. 4 illustrates an exemplary message flow diagram of a location-based authentication procedure, according to an embodiment of the present disclosure.

Referring now to FIG. 4, an exemplary message flow diagram of a location-based authentication procedure 400 is illustrated, according to an embodiment of the present disclosure. The illustrated message flow diagram includes the mobile device 100 and the enterprise intranet 300. The illustrated mobile device 100 includes the application 302, the LTS LIB 308, the LSA 316, the SIM system 132, and the SIM data 318. The illustrated enterprise intranet 300 includes the LTS server 200 and the SSO system 326.

The message flow begins, at step 402, when a user initiates the application 302 on the mobile device 100, for example, by selecting an icon representative of the application 302 from the display 102 using the I/O interface 118. Alternatively, the application 302 can be initiated automatically by another application, in response to the mobile device 100 coming within a threshold distance of the enterprise intranet 300, or when the mobile device 100 comes in communication with the enterprise intranet 300.

In any case, the application 302 starts and, upon startup, the application 302 sends, at step 404, a request (call init LTS( )) to the LTS LIB 308. The request is to initialize LTS service. The LTS LIB 308 is called upon by the application 302 to authenticate a user to the application 302. At step 406, the LTS LIB 308 receives the request, generates a location request message (get current location( )), and sends the location request message to the LSA 316. At step 408, the LSA 316 receives the location request message, determines the location of the mobile device 100 using any of the location determining techniques described above, and returns a location response message (return current location( )), including the mobile device's present location, to the LTS LIB 308.

At step 410, the LTS LIB 308 generates an UUID/TN request message (get UUID/TN( )) and sends the UUID/TN request message to the SIM system 132 to retrieve the UUID/TN. As described above, in some embodiments, the UUID and the TN are stored as SIM data 318 in the SIM system 132. Alternatively, the UUID and the TN are stored in the memory 106 and the UUID and the TN are retrieved from the memory 106.

In the illustrated embodiment, at step 412, the SIM system 132 receives the UUID/TN request message, retrieves the UUID, generates a UUID/TN response message (return UUID/TN( )) including the UUID and the TN, and sends the UUID/TN response message to the LTS LIB 308. At this point, the LTS LIB 308 knows the present location of the mobile device 100, the UUID of the mobile device 100, and the TN of the mobile device 100.

At step 414, the LTS LIB 308 generates a message (call LTS service . . . ( )) including the location information (e.g., latitude/longitude coordinates), the UUID, the TN, and the current LTS key (if any). The LTS LIB 308 sends the message to the LTS server 200, whereat it is determined if (a) a valid session exists for the identified user/mobile device (i.e., if the mobile device 100 is logged in to the enterprise intranet 300) and (b) the mobile device 100 is in a location within a threshold distance or alternatively the mobile device 100 is in a location within the threshold distance within a specified time period (temporal threshold). For determining if the mobile device 100 is in a location within a threshold distance, the LTS server 200, in some embodiments, determines if the mobile device 100 is within a predetermined distance from the LTS server 200.

The LTS server 200 enforces re-authentication if the mobile device 100 moves a predetermined distance, such as, a distance greater than the threshold distance or a predetermined distance from a location of the last user login. In some embodiments, the threshold distance is supplemented with a temporal threshold such that the mobile device 100 is required to re-authenticate if the mobile device 100 travels a certain distance within a certain time. For example, the distance and temporal thresholds can be set such that the mobile device 100 is required to re-authenticate to the LTS server 200 if the mobile device 100 travels more than five miles within one hour. The distance and temporal thresholds are variable and may be increased or decreased based upon the desired security level for a given application. Certain applications may benefit from increased security while others may receive no appreciable benefit or may be considered a low security risk application. For example, the distance and/or temporal threshold values may be adjusted to require more frequent re-authentication requests by reducing the distance and/or temporal threshold values or to require less frequent re-authentication by increasing the distance and/or temporal threshold values.

If the location satisfies the threshold distance (and optional temporal threshold), at step 416, the LTS server 200 returns the user's information to the LTS LIB 308. Alternatively, if the location and time period since last authentication satisfies the distance and temporal thresholds, respectively, at step 416, the LTS server 200 returns the user's information to the LTS LIB 308. At step 418, the LTS LIB 308 forwards the user's information to the application 302 at which point the user can access the application 302 as an authenticated user.

If the LTS server 200 determines that the location of the mobile device 100 fails to satisfy the threshold distance, or alternatively that the location and time period since last authentication fails to satisfy the distance and temporal thresholds, respectively, the LTS server 200, at step 420, generates a message (return user not logged in( )) indicating that the user is not logged in and returns the message to the LTS LIB 308. In some embodiments, the LTS server 200 is also configured to generate a message indicating that the user is not logged in and return the message to the LTS LIB 308 if the provided UUID, TN, and/or LTS key is/are incorrect, a session does not exist, or the authentication otherwise fails.

At step 422, the LTS LIB 308 returns a login page to the application 302. At step 424, the application 302 presents the login page to the user by providing the login page to the display 102 of the mobile device 100. At step 426, the mobile device 100 receives the user's login information (e.g., user ID and password) from the user via the I/O interface 118, for example. The password may include numbers, letters, characters, or combinations thereof.

At step 428, the application 302 forwards the user ID and password to the LTS LIB 308. The LTS LIB 308 receives the user 1D and password and, at step 430, generates a location request message (get current location( )) and sends the location request message to the LSA 316. At step 432, the LSA 316 determines the location of the mobile device 100 using any of the location determining techniques described above and returns a location response message (return current location( ), including the mobile device's present location, to the LTS LIB 308.

At step 434, the LTS LIB 308 generates an UUID/TN request message (get UUID/TN( )) and sends the UUID/TN request message to the SIM system 132 to retrieve the UUID/TN. As described above, in some embodiments, the UUID and the TN are stored as SIM data 318 in the SIM system 132. Alternatively, the UUID and the TN are stored in the memory 106 and the UUID and the TN are retrieved from the memory 106. In the illustrated embodiment, at step 436, the SIM system 132 receives the UUID/TN request message, retrieves the UUID, generates a UUID/TN response message (return UUID/TN( )) including the UUID and the TN, and sends the UUID/TN response message to the LTS LIB 308. At this point, the LTS LIB 308 knows the present location of the mobile device 100, the UUID of the mobile device 100, and the TN of the mobile device 100. The LTS LIB 308 also knows the user ID and password as provided by the user at step 426.

At step 438, the LTS LIB 308 generates a message (call LTS service . . . ( )) including the location information (e.g., latitude/longitude coordinates), the UUID, the TN, the user ID, and the password. At step 440, the LTS server 200 provides the user ID and password to the SSO system 326 and a user session is created at step 442. At step 444, the LTS server 200 returns the user's information to the LTS LIB 308. At step 446, the LTS LIB 308 forwards the user's information to the application 302 at which point the user can access the application 302 as an authorized user.

Figure 5:
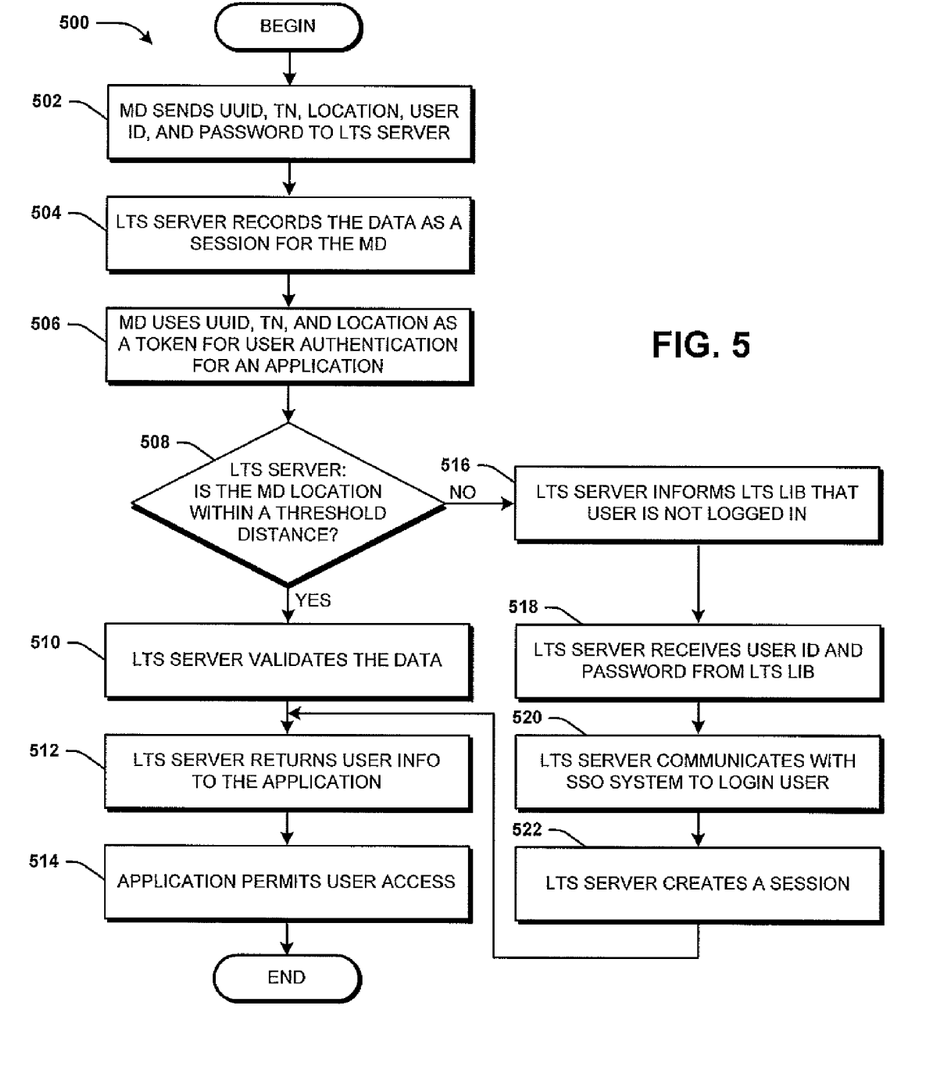
FIG. 5 illustrates an exemplary method for authenticating a mobile device to access an application based, in part, upon the location of the mobile device, according to an embodiment of the present disclosure.

Referring now to FIG. 5, an exemplary method 500 for authenticating the mobile device 100 to access an application based, in part, upon the location of the mobile device, according to an embodiment of the present disclosure. It should be understood that the steps of the method 500 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. In certain embodiments, some or all steps of this process, and/or substantially equivalent steps are performed by execution of computer-readable instructions stored or included on a computer-readable medium, such as the memory 106 of the mobile device 100 or the memory module 202 of the LTS server 200, for example.

The method 500 beings and flow proceeds to block 502, wherein the mobile device 100 sends data, including the UUID, TN, location, user ID and password to the LTS server 200. At block 504, the LTS server 200 records the data and creates a session for the mobile device 100. At block 506, the mobile device 100 can then use the UUID, TN, and location as a token for user authentication for an application. At decision block 508, the LTS server 200 determines if the mobile device 100 location is within a threshold distance. If it is determined that the LTS server 200 is within the threshold distance, at block 510, the LTS server 200 validates the data. At block 512, the LTS server 200 returns the user's information to the application. At block 514, the application permits user access. The method 500 can end.

If it is determined by the LTS server 200 that the mobile device 100 is not within the distance threshold or alternatively if the mobile device 100 is not within the distance threshold for a given temporal threshold, at block 516. At block 518, the LTS server 200 receives the user ID and password from the LTS LIB 314 and, at block 520, communicates with the SSO system 326 to login the user. At block 522, the LTS server 200 creates a session and flow proceeds to block 512. At block 512, the LTS server 200 returns the user's information to the application. At block 514, the application permits user access. The method 500 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for authenticating a mobile device associated with a user to permit the mobile device to access an application, comprising:
    determining, by the mobile device, a location of the mobile device;
    receiving, by the mobile device, via an input interface of the mobile device, a user identification and a password;
    retrieving, from a subscriber identity system of the mobile device, a universal unique identifier and a telephone number;
    generating, by the mobile device, a first message including the location, the universal unique identifier, the telephone number of the mobile device, the user identification, and the password;
    sending the first message to a location token service server;
    recording, by the location token service server, the location, the universal unique identifier the telephone number, the user identification, and the password;
    authenticating, by the location token service server, the user identification and the password;
    creating, by the location token service server, a user session associated with the mobile device based upon the location, the universal unique identifier, the telephone number, the user identification, and the password;
    determining, subsequent to the user session being created, in response to an application being initiated on the mobile device, a current location of the mobile device and generating a second message including the current location, the universal unique identifier, the telephone number, the user identification, and the password;
    sending the second message to the location token service server;
    determining, by the location token service server, whether the current location is within a threshold distance of the location for a temporal threshold; and
    returning, by the location token service server, if the location token service server determines that the current location is within the threshold distance of the location for the temporal threshold, a token to the mobile device, the token being used by the mobile device to permit access to the application.

2. The method of claim 1 further comprising, if the location token service server determines that the current location is not within the threshold distance of the location for the temporal threshold:
    notifying, by the location token service server, the mobile device that the user is not logged in thereby triggering the application to prompt the user for the user identification and the password to re-authenticate the user to the application;
    determining, by the mobile device, a new location of the mobile device;
    generating, by the mobile device, a third message including the new location, the universal unique identifier, the telephone number, the user identification, and the password;
    sending the third message to the location token service server;

logging in, by the location token service server, the user with the user identification and the password;

creating, by the location token service server, a new user session for the mobile device;

returning, by the location token service server, a new token to the mobile device, the token being used by the mobile device to permit access to the application.

3. The method of claim 2, wherein determining the location, the current location, and the new location comprises determining the location and the current location using a location component of the mobile device, the location component using at least one location determining technique to determine the location, the current location, and the new location.

4. The method of claim 1, wherein determining the location and the current location comprises determining the location and the current location using a location component of the mobile device, the location component using at least one location determining technique to determine the location and the current location.

5. The method of claim 1, wherein retrieving, from the subscriber identity system of the mobile device, the universal unique identifier and the telephone number comprises retrieving, from a subscriber identity module, the universal unique identifier and the telephone number.

6. The method of claim 1, wherein retrieving, from the subscriber identity system of the mobile device, the universal unique identifier and the telephone number comprises retrieving, from a memory of the mobile device, the universal unique identifier and the telephone number.

7. The method of claim 1, further comprising authenticating the mobile device associated with the user to permit the mobile device to access the application residing on the mobile device.

8. The method of claim 1, further comprising authenticating the mobile device associated with the user to permit the mobile device to access the application residing on a server in a network.

9. The method of claim 8, wherein returning, by the location token service server, the token to the mobile device comprises returning, by the location token service server, the token comprising the user identification and the password.

10. A method, for authenticating a mobile device associated with a user to permit the mobile device to access an application, comprising:

receiving, by a location token service library of the mobile device, a request to initiate a location token service in response to the application being initiated on the mobile device;

requesting, by the location token service library, a current location of the mobile device from a location services application of the mobile device, the location services application using a location component of the mobile device to determine the current location of the mobile device;

receiving, by the location token service library, the current location from the location services application;

requesting, by the location token service library, a universal unique identifier and a telephone number from a subscriber identity system of the mobile device;

receiving, by the location token service library, the universal unique identifier and the telephone number from the subscriber identity system;

generating, by the location token service library, a message comprising the current location, the universal unique identifier, and the telephone number;

communicating, by the location token service library, communicating with an location token service server to transmit the message;

receiving, by the location token service library, user login information from the location token service server;

providing, by the location token service library, the user login information to the application, permitting a user to access the application on the mobile device; and receiving, by the location token service library, a notification from the location token service server indicating that the user is not logged in and therefore unable to access the application, the notification being triggered at the location token service server in response to the current location of the mobile device being outside of a predetermined location in which access to the application is permitted.

11. The method of claim 10, wherein retrieving, by the location token service library, the user login information from the location token service server and providing the user login information to the application comprises receiving, by the location token service library, a token from the location token service server and providing the token to the application.

12. The method of claim 10, further comprising receiving, by the location token service library, a current location token service key from the location token service server, wherein generating, by the location token service library, the message comprises generating the message further including the current location token service key.

13. A method, for selectively permitting user access to an application stored on a mobile device, comprising:

providing, by the mobile device, upon the application being initiated at the mobile device, authentication information to a location token service server to authenticate a user of the mobile device to access the application, the authentication information comprises a current location of the mobile device, a user identification, and a password; and determining, by the location token service server, whether the current location of the mobile device is within a threshold distance;

providing, by the location token service server, if the location token service determines that the current location of the mobile device is within the threshold distance, the mobile device with a location token service token used by the mobile device to permit the user to access the application; and denying, by the location token server server, if the location token service determines that the current location of the mobile device is not within the threshold distance, the user access to the application.

14. The method of claim 13, wherein the authentication information further comprises a universal unique identifier of the mobile device and a telephone number of the mobile device.

15. The method of claim 14, further comprising determining, by the location token service server, whether the universal unique identifier and the telephone number are associated with an established user session.

16. The method of claim 14, further comprising retrieving, by the mobile device, the universal unique identifier and the telephone number from a subscriber identity module of the mobile device.

17. The method of claim 13, further comprising retrieving, by the mobile device, the current location from a location services application of the mobile device, the location services application using a location component of the mobile device to determine the current location.

18. The method of claim 13, further comprising determining, by the location token service server, if the current location of the mobile device is within the threshold distance within a predetermined time.

19. The method of claim 13, further comprising:
prompting, by the location token service server, the user of the mobile device for the user identification and the password;
prompting, by the location token service server, the mobile device for a universal unique identifier and a telephone number of the mobile device;
prompting, by the location token service server, the mobile device for a new location of the mobile device;
creating, by the location token service server, a new user session based upon the user identification, the password, the universal unique identifier, the telephone number, and the new location; and
assigning, by the location token service, a new threshold distance from the new location and a new temporal threshold for the new user session, the new threshold distance defining a distance within which the location token service server will permit the user to access the application and the new temporal threshold defining a time period within which the user must access the application without having to re-authenticate the application to the location token service server.

\* \* \* \* \*